United States Patent [19]

Yamasaki

[11] Patent Number: 5,499,383
[45] Date of Patent: Mar. 12, 1996

[54] DMA CONTROL DEVICE CONTROLLING SEQUENTIAL STORAGE OF DATA

[75] Inventor: Takashi Yamasaki, Hyogo, Japan

[73] Assignee: Mitsubishi Denki Kabushiki Kaisha, Japan

[21] Appl. No.: 301,222

[22] Filed: Sep. 6, 1994

Related U.S. Application Data

[63] Continuation of Ser. No. 716,499, Jun. 17, 1991, abandoned.

[30] Foreign Application Priority Data

Jul. 20, 1990 [JP] Japan ................................. 2-192664

[51] Int. Cl.$^6$ ........................... G06F 13/20; G06F 13/28
[52] U.S. Cl. ...................... 395/842; 395/851; 395/307; 395/311; 395/421.07; 364/DIG. 1; 364/242.3; 364/239.3; 364/251.1; 364/240.7
[58] Field of Search .................................. 395/425, 375, 395/400, 842, 311, 307, 421.07, 851; 364/DIG. 1, DIG. 2

[56] References Cited

U.S. PATENT DOCUMENTS

| | | | |
|---|---|---|---|
| 4,109,310 | 8/1978 | England et al. | 395/375 |
| 4,447,878 | 5/1984 | Kinnie et al. | 395/325 |
| 4,631,671 | 12/1986 | Kawashita et al. | 395/425 |
| 4,878,166 | 10/1989 | Johnson et al. | 395/425 |
| 5,214,767 | 5/1993 | Wanner et al. | 395/425 |
| 5,243,701 | 9/1993 | Maramatsu et al. | 395/325 |

FOREIGN PATENT DOCUMENTS

| | | |
|---|---|---|
| 3905304A1 | 9/1989 | Germany. |
| 2216304 | 2/1988 | United Kingdom. |
| 2202351 | 3/1988 | United Kingdom. |
| 2221553 | 11/1988 | United Kingdom. |
| 2222471 | 8/1989 | United Kingdom. |
| 2230117 | 2/1990 | United Kingdom. |

*Primary Examiner*—Eddie P. Chan
*Assistant Examiner*—Reginald G. Bragdon
*Attorney, Agent, or Firm*—Townsend and Townsend and Crew

[57] ABSTRACT

A DMA transfer of 8-bit units and 16-bit units can be performed regardless of the proceeding direction of the address and whether the first address to be accessed is even or odd. In a conventional DMA transfer, the DMA control device required a function for selecting 8-bit configuration or 16-bit configuration of transfer data when the proceeding directions of addresses at the transfer source and transfer destination were different. The present invention reverses a determined result and indicates whether the first address to be transferred is even or odd, when the proceeding direction of the address is "reverse" and the data has a 16-bit configuration.

14 Claims, 10 Drawing Sheets

| X | Y | Z | CNT | |
|---|---|---|-----|---|
| 0 | 0 | 0 | 0 | |
| 0 | 0 | 1 | 1 | NO REVERSE |
| 0 | 1 | 0 | 0 | |
| 0 | 1 | 1 | 1 | |
| 1 | 0 | 0 | 0 | |
| 1 | 0 | 1 | 1 | |
| 1 | 1 | 0 | 1 | REVERSE |
| 1 | 1 | 1 | 0 | |

DMA CONTROL DEVICE CONTROLLING SEQUENTIAL STORAGE OF DATA

This is a continuation of application Ser. No. 07/716,499, filed Jun. 17, 1991, now abandoned.

BACKGROUND OF THE INVENTION

1. Field of the Invention

The present invention relates to a DMA (Direct Memory Access) control device for a computer.

2. Description of Prior Art

Figure 6:
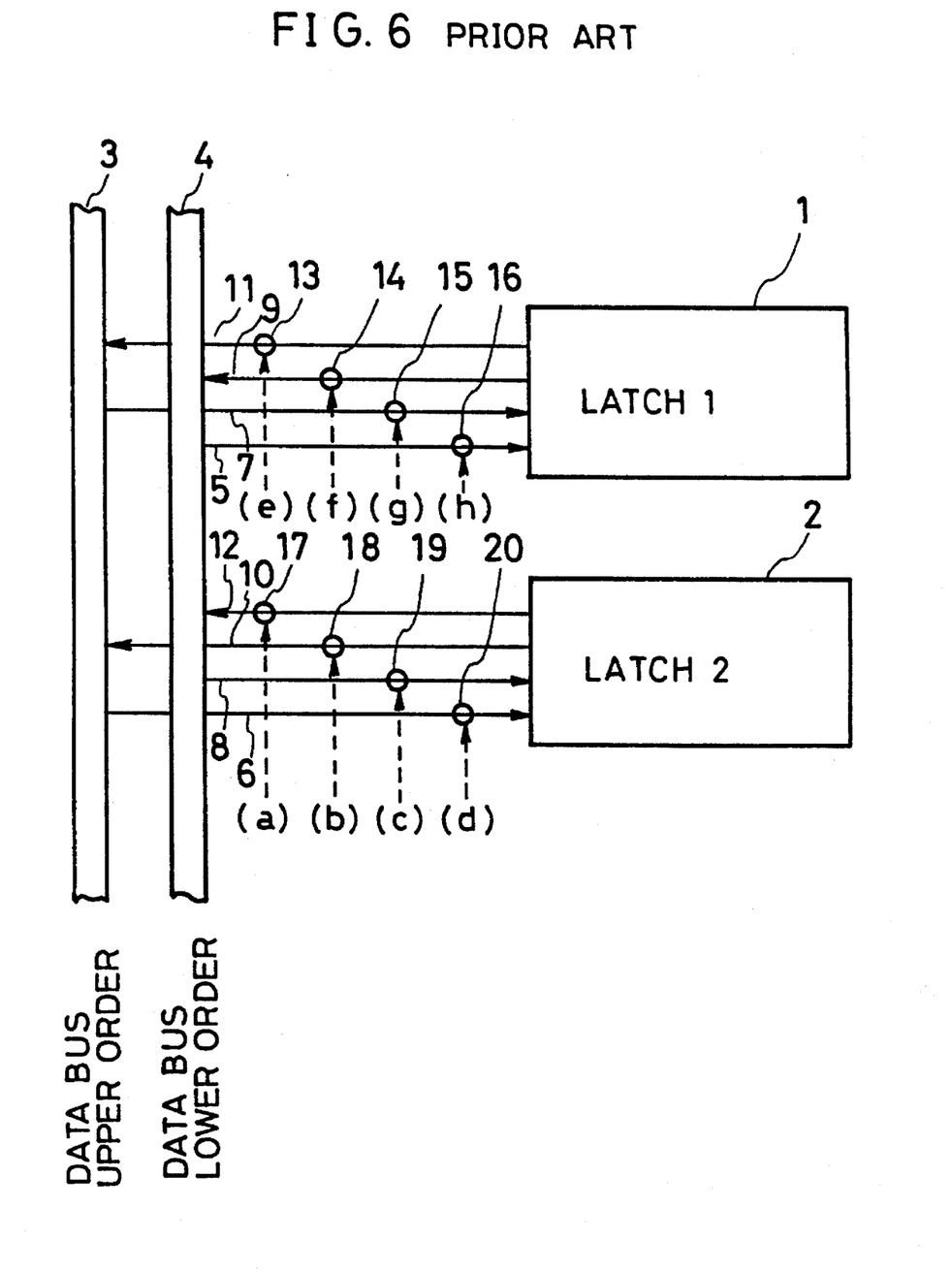
FIG. 6 is a schematic diagram of latches and data buses used in a conventional DMA transfer.

FIG. 6 is a schematic diagram showing latches and data buses to be used in DMA transfer. In the Figure, numeral 1 represents a latch in which first data is to be stored, numeral 2 represents a latch in which second data is to be stored. Those latches temporarily store address designation unit data, i.e. 8-bit data here, as temporary storing means. Numeral 3 represents an upper 8-bit portion and 4 represents a lower 8-bit portion of a 16-bit data bus. Numeral 5 represents a signal line for inputting data to the latch 1 from the lower order data bus 4. Numeral 16 represents a switch for turning on or off the signal line 5. Numeral 6 indicates a signal line for inputting data to the latch 2 from the upper order data bus 3. Numeral 20 indicates a switch thereof. In the same manner, numerals 7 and 8 indicate signal lines for inputting data to latches 1 and 2 from the upper and lower order data buses 3 and 4 respectively, and numerals 15 and 19 are switches thereof. On the other hand, numeral 9 indicates a signal line for outputting data to the lower order data bus 4 from the latch 1, and numeral 14 indicates a switch thereof. Numeral 10 indicates a signal line for outputting data to the upper order data bus 3 from the latch 2, and numeral 18 represents a switch thereof. Numerals 11 and 12 are signal lines for outputting signals to the upper and lower order data buses 3 and 4 from the latches 1 and 2 respectively in the same manner as above, and numerals 13 and 17 are switches thereof. The switches 13 through 20 are switching means for shifting input/output between the latches 1, 2 and the upper and lower order data buses 3, 4. Characters (a), (b), (c), and (d) represent control signals for turning on or off the switches 17, 18, 19 and 20, respectively. Characters (e), (f), (g), and (h) are control signals for turning on or off the switches 13, 14, 15 and 16, respectively.

Figure 7:
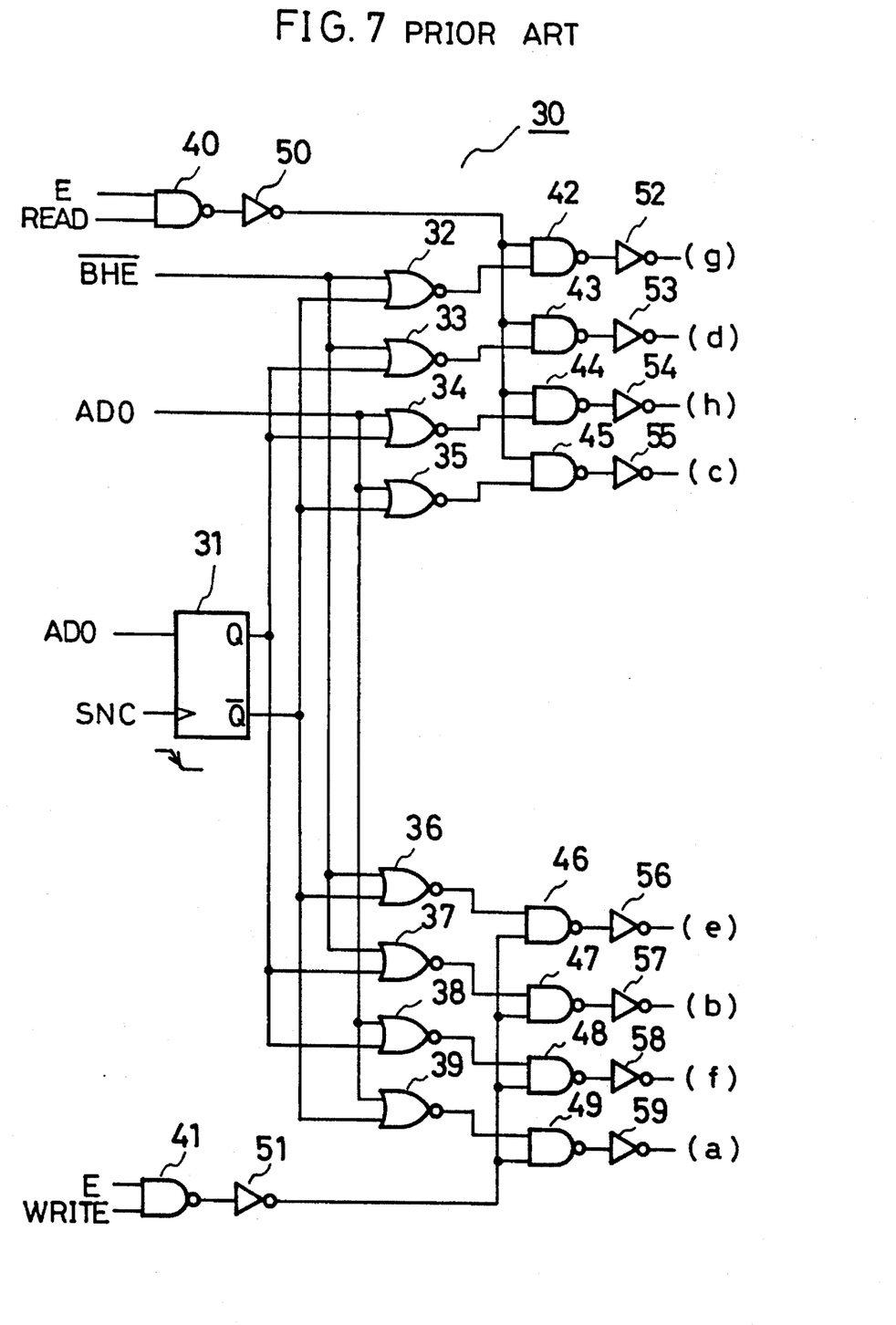
FIG. 7 is a diagram showing a control signal generating circuit in the conventional device.

FIG. 7 shows a configuration of a conventional control signal generating circuit. In the Figure, numeral 31 designates a flip-flop configuring determining means for determining whether a first address to be transferred is an even number or an odd number. SNC indicates a timing signal to be outputted at the beginning of the transfer cycle. ADO represents the lowest order bit of the address and becomes "L" when an address to be accessed is an even number. Accordingly, the output of the flip-flop is maintained during the transfer cycle, at the value of the lowest order bit of the first address to be accessed at transferring. A signal E becomes "H" at bus accessing. A signal READ becomes "H" during a reading cycle. A signal BHE becomes "L" when accessing an odd address. When 2-bytes of reading or writing can be performed at the same time, both ADO and BHE become "L", so that the data bus upper and lower orders can be accessed at the same time. Numerals 32 to 39 indicate NOR gates, numerals 40 to 49 indicate NAND gates, and numerals 50 to 59 represent NOT gates. Those members construct a control signal generating circuit 30.

Figure 8A:
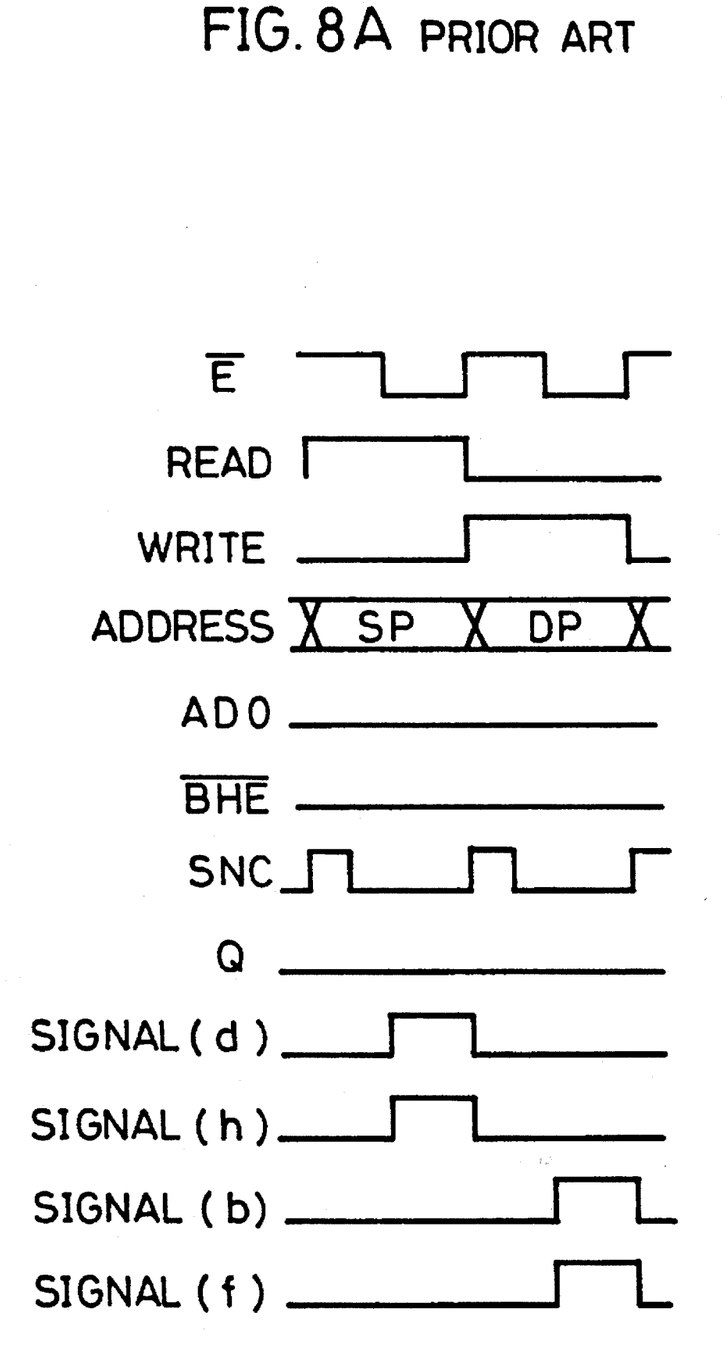
FIGS. 8A–C are timing charts during main accessing in the conventional DMA transfer.
Figure 8B:
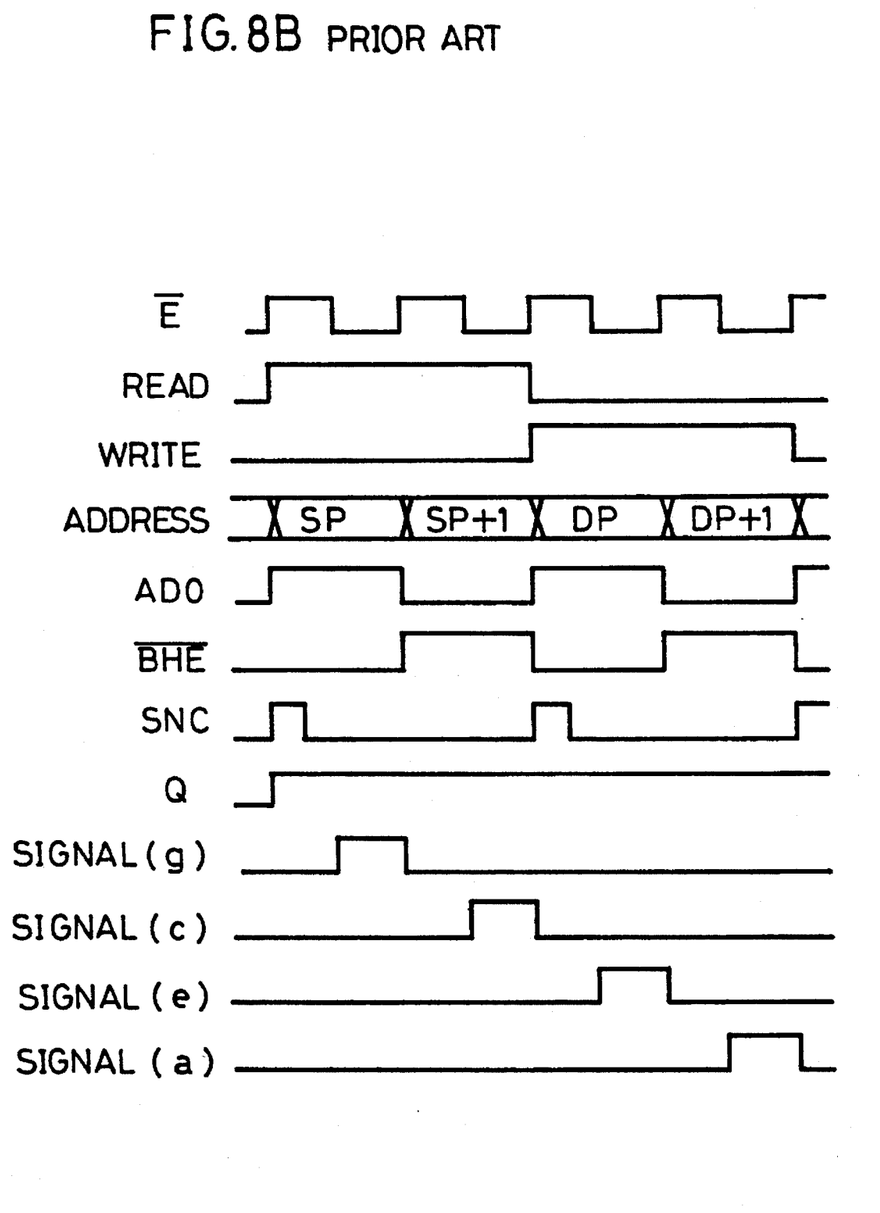
Figure 8C:
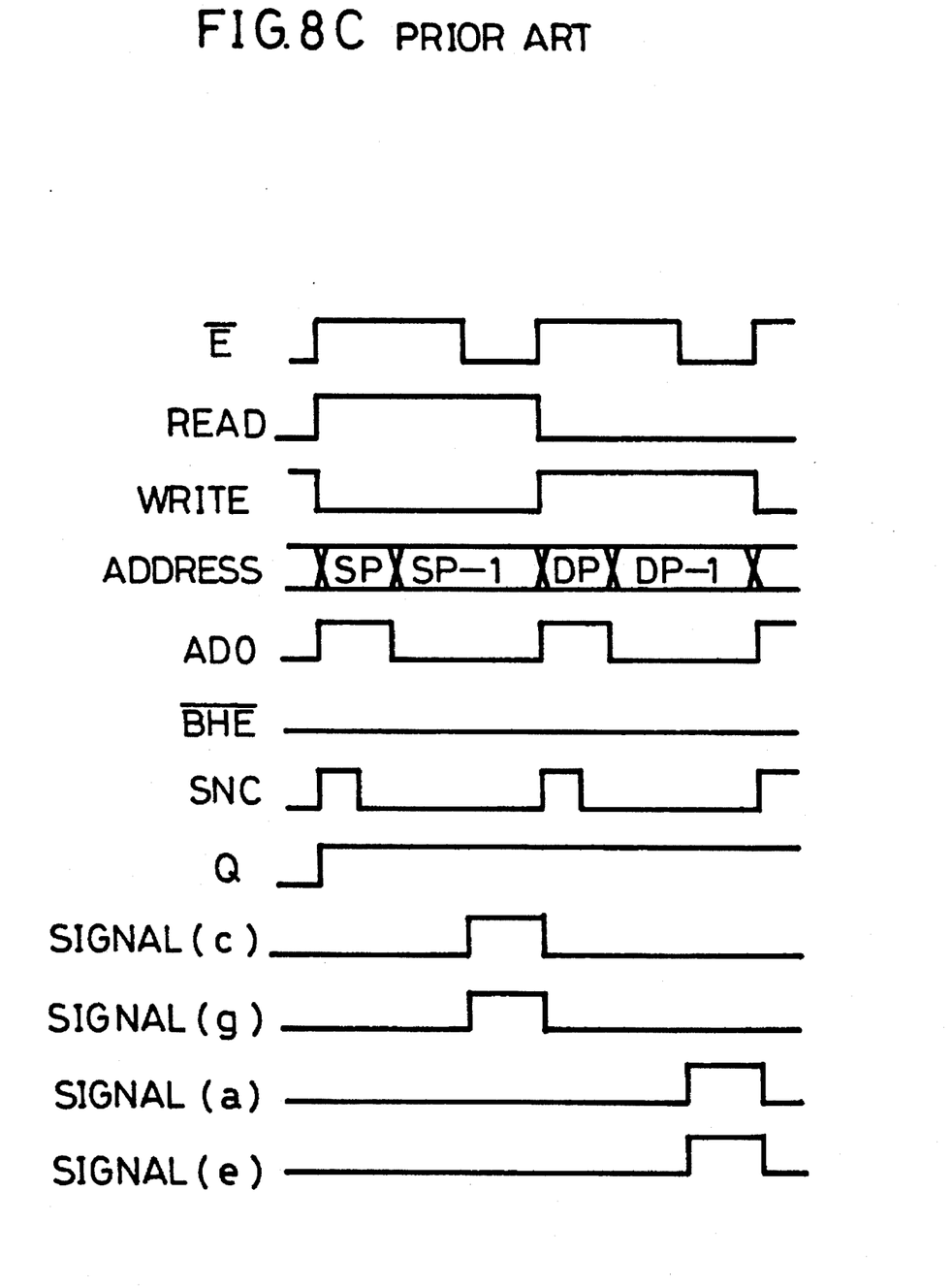

The operation will be explained hereinafter. FIGS. 8A through C are timing charts at main accessing times during DMA transfer.

FIG. 8A shows an example where the first address to be accessed is even and the address is incremented, i.e., changes in the forward direction. At this time, the data bus upper and lower orders can both be accessed at the same time. Both ADO and BHE become "L" and an output Q of the flip-flop 31 becomes "L". Accordingly, during reading, control signals (d) and (h) are outputted. Data of the lower order data bus 4 is stored in latch 1 through signal line 5, and data of the upper order data bus 3 is stored in latch 2 through signal line 6. In the same manner, the control signals (b) and (f) are outputted during writing. Data in latch 1 is applied to the lower order data bus 4 through signal line 9, and data in latch 2 is applied to the upper order data bus 3 through signal line 10.

FIG. 8B shows an example where the first address to be accessed is odd and the address is incremented, i.e., is changed in the forward direction. At this time, since the first address is odd, accessing is to be performed by means of 2 bus cycles. In the first bus cycle, ADO will be "H" and BHE will be "L". Since SNC is to be outputted only at the first bus cycle, the output Q of the flip-flop 31 becomes "H" and this value is maintained until 2 bus cycles are terminated. Accordingly, during reading, the control signal (g) is outputted at the first bus cycle and data from the upper order data bus 3 is stored in the latch 1. At next bus cycle, ADO is "L" and becomes "H". The output Q of the flip-flop 31 is maintained in the "H" state so that the output signal (c) is outputted and a data from the lower order data bus 4 is stored in the latch 2. In the same manner, during writing, the control signal (e) is outputted at the first bus cycle and data from latch 1 is applied to the upper order data bus 3. At the next bus cycle, the control signal (a) is outputted and data from latch 2 is applied to the lower order data bus 4.

FIG. 8C shows an example where the first address to be accessed is odd and the address decrements, i.e., changes in the reverse direction. At the time, as shown by the timing chart, one address is decremented and 2 bytes are accessed at the same time. Both ADO and BHE become "L" and the output Q of the flip-flop 31 becomes "H" since the value at the time when ADO is "H" is maintained. Accordingly, during reading, the signals (c) and (g) are outputted. Data from the upper order data bus 3 is stored in latch 1 and the data from the lower order data bus 4 is stored in latch 2. During writing, the signals (a) and (e) are outputted. Data from latch 1 is applied to the upper order data bus 3 and data from latch 2 is applied to the lower order data bus 4, respectively.

As is apparent from the above, data at the first address shown is sent to latch 1 and data at the next address shown is sent to latch 2 regardless of whether the next address is incremented or decremented. Accordingly, even if combinations of address incrementing (forward direction) and address decrementing (reverse direction) and combinations of even or odd first address are made for both reading and writing, a normal transfer of data can be performed.

Figure 4:
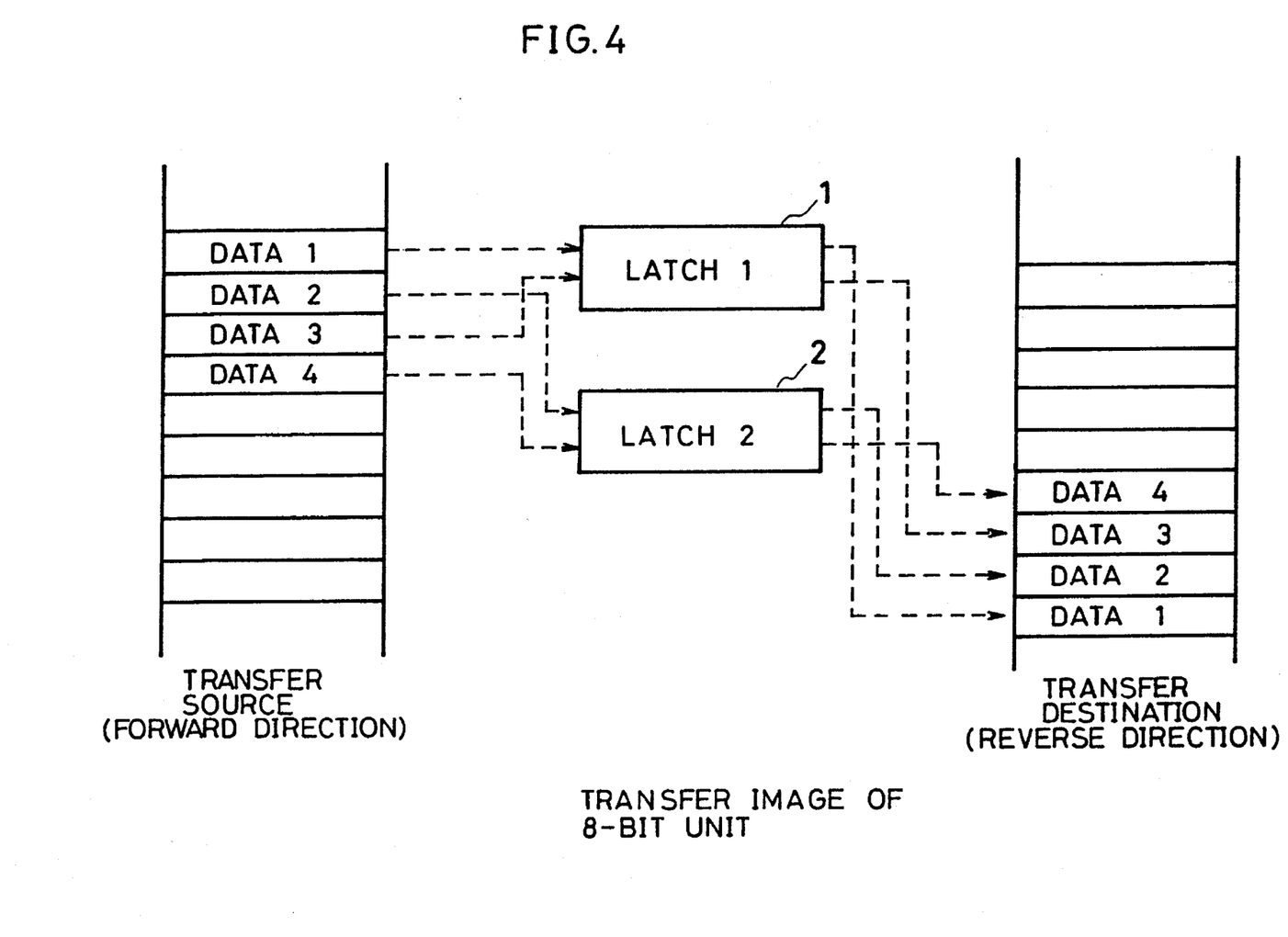
FIG. 4 is a diagram showing transfer of an 8-bit data unit.
Figure 5:
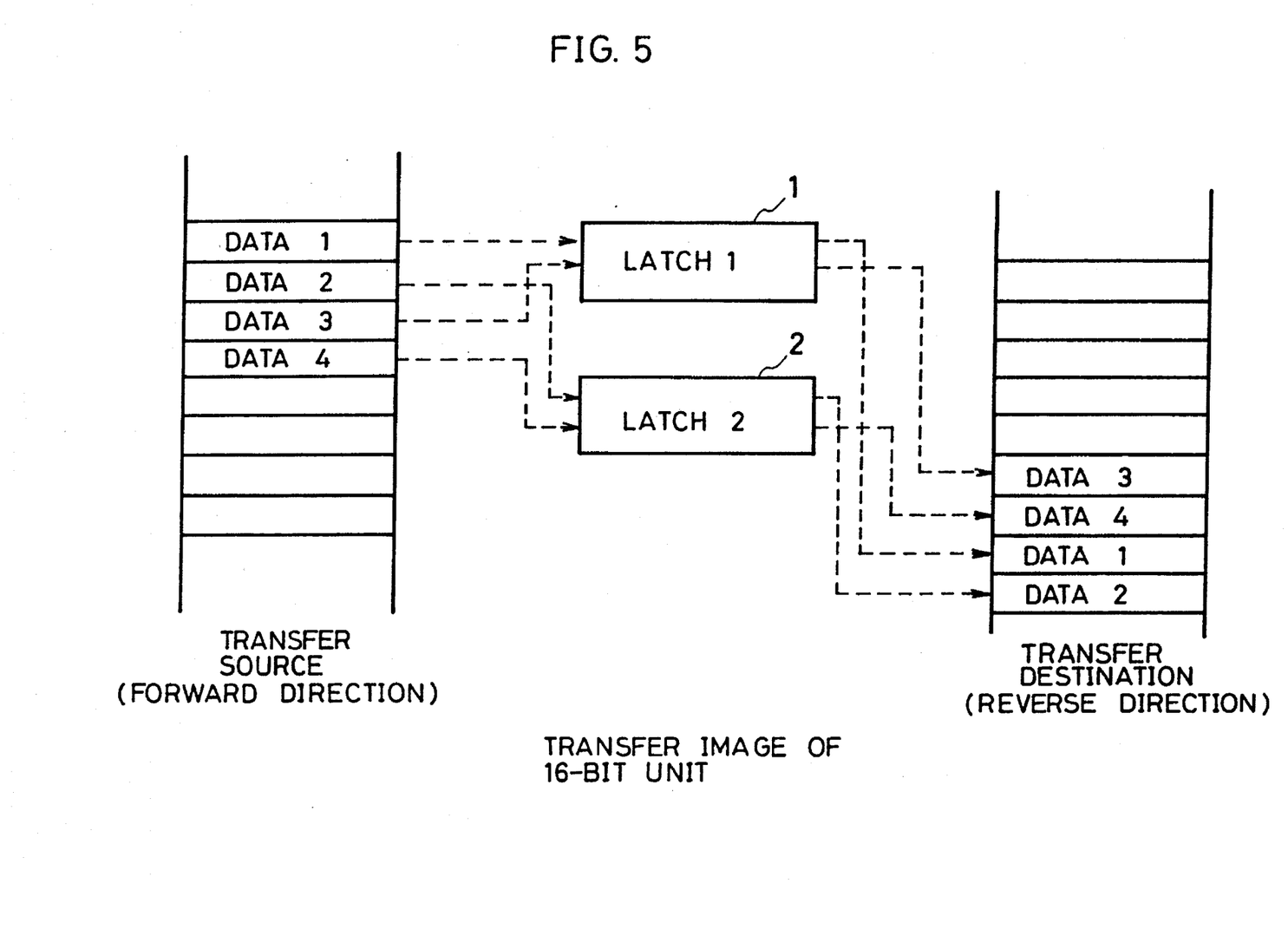
FIG. 5 is a diagram showing transfer images of a 16-bit data unit.

As described above, the conventional DMA control device is constructed such that a user can select either incrementing or decrementing of the source address and transfer address. However, in such a configuration, when a transfer source is set to the forward direction and a transfer destination is set to the reverse direction as shown in FIGS. 4 and 5, a problem arises that 16-bit data will be transferred in a state where the positions of the upper order and the lower order are exchanged with each other since all data are handled as 8-bit data. An example, in which the transfer source is set to the forward direction and the transfer destination is set to the reverse direction, is a device adapted for controlling a motor rotation speed, in which data at the transfer source is used for increasing the rotation speed of the motor gradually and data at the transfer destination is used for decreasing the rotation speed gradually.

SUMMARY OF THE INVENTION

The present invention has been developed in order to eliminate the above-mentioned problem and an object of the present invention is to provide a DMA control device wherein switching can be performed for both 8-bit data and 16-bit data.

Figure 1:
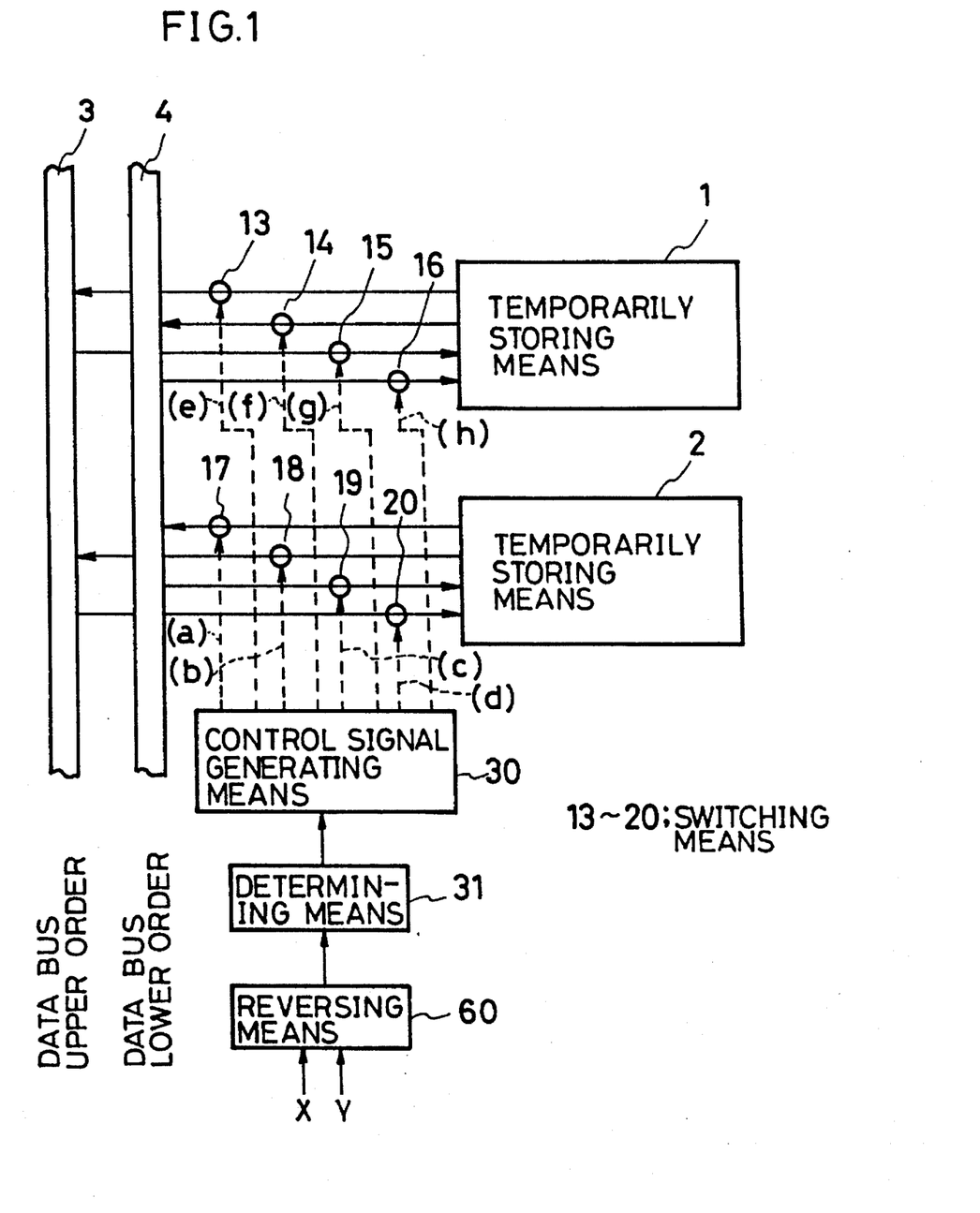
FIG. 1 is a block diagram showing a DMA control device according to the present invention.

A DMA control device according to the present invention, as shown in FIG. 1, comprises a plurality of temporary storing means 1 and 2 for temporarily storing data to be transferred from a transfer source to a transfer destination through data buses 3 and 4 at every address designating unit, data switching means 13 to 20 for shifting input/output between the temporary storing means 1, 2 and each unit of data from the data buses 3, 4, and control signal generating means 30 for generating control signals (a) through (h) for controlling the switching means 13 through 20. The DMA control device is also provided with determining means 31 for determining whether the first address to be transferred is even or odd. The control signal generating means 30 produces control signals (a) through (h) in accordance with the determined result, so that data are to be stored in the temporary storing means 1 and 2 while handling the order of addresses regardless of whether the first address to be transferred is even or odd and whether the proceeding direction of the address is the forward direction or the reverse direction. The control device further comprises reversing means 60 for reversing the determined result from the determining means 31 in accordance with a signal X indicating the proceeding direction of the address and a signal Y indicating the bit configuration of the transfer data when the proceeding direction of the address is "reverse" and the bit configuration of the transfer data is multiple unit data. In such a configuration, regardless of the proceeding directions of the address and of whether the first address to be accessed is even or odd, the DMA transfer of 8-bit data units, 16-bit data units and the like can be performed.

The above and other objects, features, and advantages of the invention will become more apparent from the following description when taken in conjunction with the accompanying drawings.

DESCRIPTION OF THE PREFERRED EMBODIMENT

An embodiment of the present invention will be explained hereinafter. As latches and data buses to be used in DMA transfer are the same as in the conventional example shown in FIG. 6, description thereof will be omitted.

Figure 2:
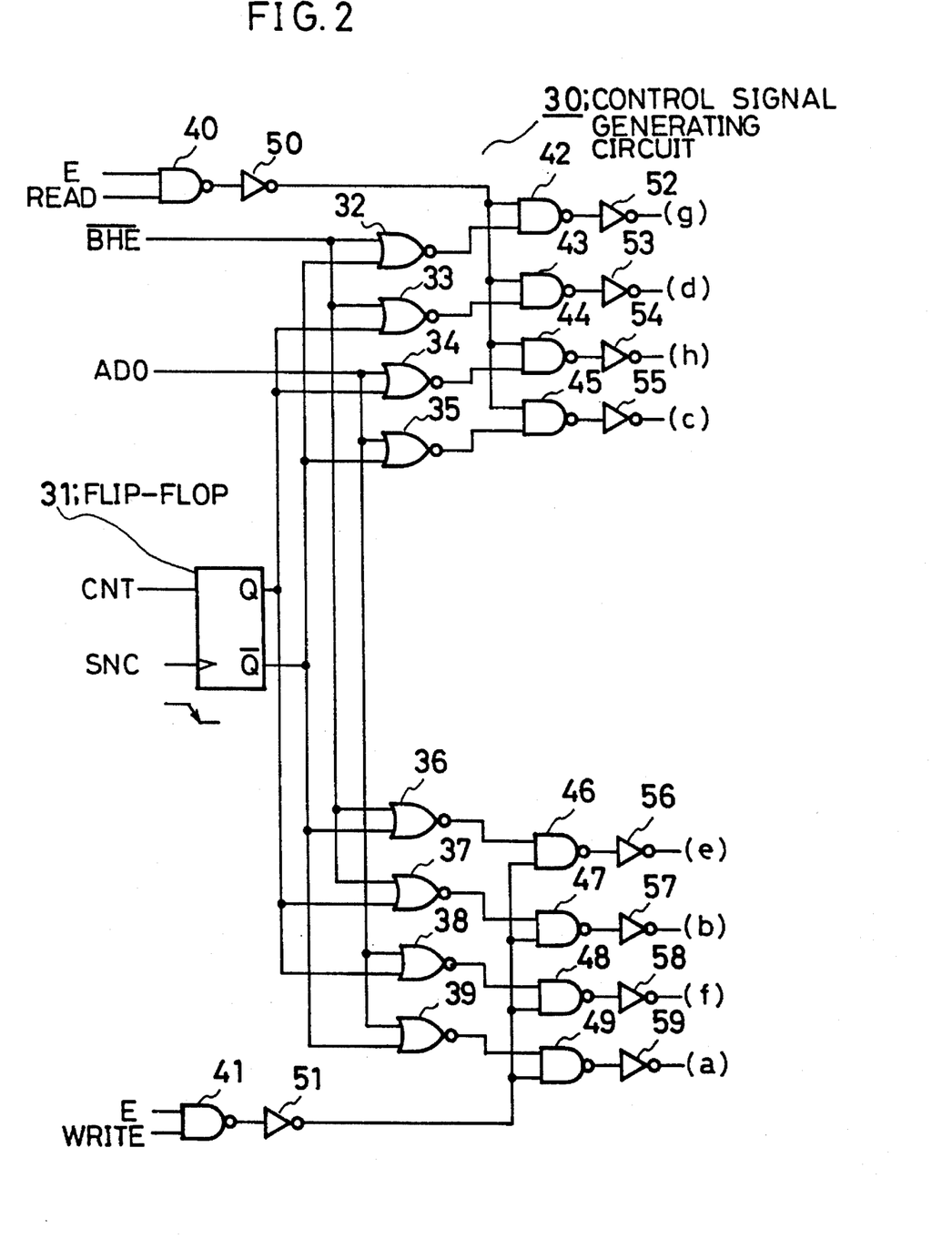
FIG. 2 is a structural diagram showing a control signal generating circuit according to an embodiment of the present invention.
Figure 3A:
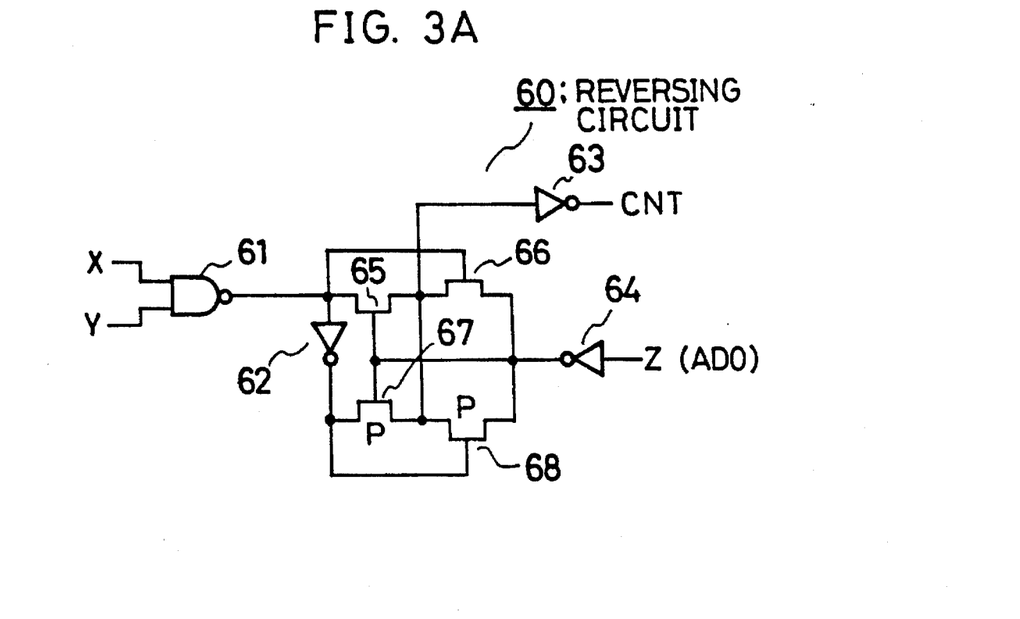
FIG. 3A is a diagram showing a reversing circuit according to one embodiment.
Figure 3B:
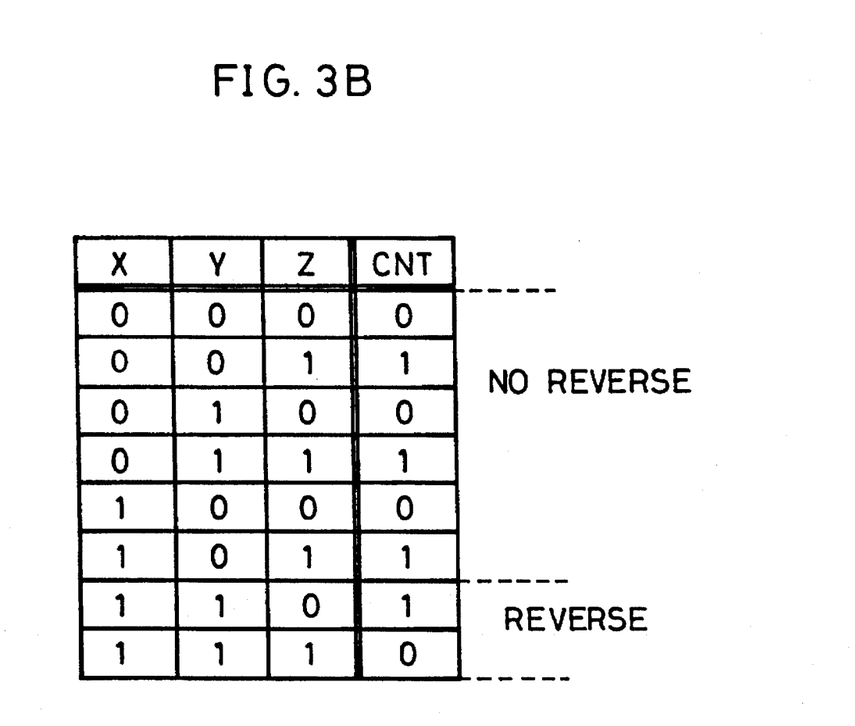
FIG. 3B is a diagram showing a truth table of the circuit of FIG. 3A.

FIG. 2 is a circuit diagram showing an embodiment of the present invention corresponding to the conventional example in FIG. 7. In the Figure, numeral 31 indicates a flip-flop constituting determining means for determining whether the first address to be transferred is even or odd. SNC, E, READ, WRITE, ADO, BHE are the same as in the conventional example, so that the explanation thereof will be omitted. CNT, which is inputted in the flip-flop 31 as a control signal for selecting latches instead of the conventional ADO, is a control signal obtainable by a reversing circuit shown in the embodiment in FIG. 3. In FIG. 3A, X indicates a signal which becomes "H" only when the proceeding direction of the address is reversed. Y is a signal for making select reversing or not and becomes "H" when the transfer data has a 16-bit configuration. Those are, for example, given by a mode register as a flag as well as an input from outside. Z corresponds to ADO, the 0-bit of the address. Numeral 61 indicates a NAND gate, numerals 62 to 64 indicate NOT gates, and numerals 65 to 68 indicate transistors. Numerals 65 and 66 are, for example, n-channel transistors, while numerals 67 and 68 are p-channel transistors. Those members construct a reversing circuit 60 which operates in the manner as shown by the truth table in FIG. 3B.

The operation will be explained hereinafter. Here, the transfer source is in a forward direction having an even first address and the transfer destination is in reverse direction having an odd first address. The timing chart of the circuit for FIG. 2 is substantially the same as that of FIG. 8 excepting that the input ADO of the flip-flop is replaced by CNT.

Firstly, an example where Y is "L" that is when the transfer data has an 8-bit configuration will be explained. During a reading cycle, X is "L" since the proceeding direction of the address is in the forward direction and Z becomes "L" since the first address is even. At this time, CNT becomes "L". Accordingly, in FIG. 2, the output Q of the flip-flop 31 becomes "L", control signals (d) and (h) are outputted, and input data from lower order data bus 4 are stored in latch 1 through signal line 5, and input data from upper order data bus 3 are stored in latch 2 through signal line 6. During a writing cycle, X is "H" since the proceeding direction of the address is reverse, and Z becomes "H" since the first address is odd. At this time, CNT becomes "H". Accordingly, in FIG. 2, the output Q of the flip-flop 31 becomes "H". Control signals (a) and (e) are outputted, and data from latch 1 is applied to the upper order data bus 3 through a signal line 11, and data from latch 2 are applied to the lower order data bus 4 through signal line 12. Such a transferring state is shown in FIG. 4.

Next, an example when Y is "H" that is when the transfer data has a 16-bit configuration, will be explained. Firstly, during reading cycle, X is "L" same as above, and Z becomes "L". At this time, CNT becomes "L". Accordingly, in FIG. 2, the output Q of the flip-flop 31 becomes "L". Control signals (d) and (h) are outputted, and input data from the lower order data bus 4 are stored in the latch 1 through the signal line 5, and input data from the upper order data bus 3 are stored in the latch 2 through the signal line 6. Next, during a writing cycle, X is "H" same as the above, and Z becomes "H" Since both X and Y are "H" a replacing condition of the lower order and the upper order is established. At this time, CNT becomes "L". Accordingly, in FIG. 2, the output Q of the flip-flop 31 becomes "L". Control signals (b) and (f) are outputted, and data from the latch 1 are applied to the lower order data bus 4 through a signal line 9, and data from the latch 2 are applied to the upper order data bus 3 through a signal line 10. Such a transferring state is shown in FIG. 5.

According to the present embodiment, as described above, by adding a little logic circuit, a DMA transfer of both 8-bit and 16-bit units can be selected regardless of the proceeding directions of the address and whether the first address to be accessed is even or odd.

Although the configuration of the transfer data in the above-mentioned embodiment is 8-bit and 16-bit, other bit configurations such as 16-bit and 32-bit are also applicable.

In the above-mentioned embodiment, although the transfer source is made to be in forward direction and the transfer destination is made to be in reverse direction, it can be vice versa effective when the proceeding directions of the addresses at the transfer source and at the transfer destination are different.

In addition, although the input of the flip-flop 31 is reversed in the above-mentioned embodiment (FIG. 1), in another embodiment, the output can be reversed instead.

Further, the temporary storing means, switching means, control signal generating means, determining means, and reversing means in the present invention are not restricted to those in the above-mentioned embodiment, but the same functions can also be provided by other known circuits.

In the DMA control device of the present invention, as described above, the reversing means is provided for reversing the determined result from the determining means for determining whether the first address to be transferred is even or odd, based on the signal indicating the proceeding directions of the addresses and the signal showing the bit configuration of the transfer data, when the proceeding direction of the address is "reverse" and the bit configuration of the transfer data is of multiple unit data, so that the DMA transfer of 8-bit units and 16-bit units and the like can be performed regardless of the proceeding directions of the addresses and whether the first address to be accessed is even or odd.

What is claimed is:

1. A DMA control device provided with a plurality of temporary storing means for data to be transferred from a transfer source beginning at a first address to a transfer destination through data buses, switching means for shifting input and output between said temporary storing means and the data buses, control signal generating means for generating control signals for controlling the switching means, and determining means outputting a determined result indicating whether said first address is even or odd, said determining means formed from a flip-flop; in which the control signal generating means produces said control signals in accordance with said determined result, so that data stored in the temporary storing means are handled in the proper order regardless of whether the first address to be transferred is even or odd and whether the proceeding direction of the address is in a forward direction or a reverse direction, the control device comprising:

reversing means, coupled to an input of said determining means, for causing said determined result output from said determining means to reverse when a first signal indicates a multiple byte configuration of transfer data and when a second signal indicates data storage in a reverse direction, the first signal indicating whether the bit configuration of the transfer data is of one byte or more than one byte, and the second signal indicating whether data are stored in storage areas arranged in an increasing address sequence or a decreasing address sequence at a transfer source, or whether data are stored in storage areas arranged in an increasing address sequence or in a decreasing address sequence at a transfer destination.

2. The DMA control device according to claim 1, wherein the data buses are 16-bit buses comprising an upper order 8-bit portion and a lower order 8-bit portion, and said temporary storing means comprises two latches, each for temporarily storing 8-bit data.

3. The DMA control device according to claim 2, wherein the switching means comprises eight switches which turn on/off individually input/output signal lines between said latches and said data bus upper/lower orders.

4. The DMA control device according to claim 2, wherein said reversing means comprises a reversing circuit, to which a signal indicating whether the proceeding direction of the address is in a forward direction or reverse direction, a signal indicating whether the bit configuration of the transfer data is of an 8-bit or 16-bit configuration, and a signal indicating the lowest order bit of the address are inputted, so that a value of the signal indicating the lowest order bit of the address is reversed when the proceeding direction of the address is said reverse direction and the transfer data is of said 16-bit configuration.

5. The DMA control device according to claim 4, wherein the signal indicating the proceeding direction of the address and the signal showing the bit configuration of the transfer data are supplied from a mode register as a flag.

6. The DMA control device according to claim 4, wherein the signal indicating the proceeding direction of the address and the signal showing the bit configuration of the transfer data are supplied as input from outside of said DMA control device.

7. The DMA control device according to claim 4, wherein the determining means retains the output of said reversing circuit in accordance with a timing signal received in said DMA control device at the beginning of a transfer cycle, and wherein said determining means outputs its value during the transfer cycle.

8. The DMA control device according to claim 7, wherein the control signal generating means comprises a combinatorial logic circuit having input signals including output Q and output Q̄ from the flip-flop, signal AD0 which represents the lowest order bit of an address and becomes "L" when the address to be accessed is even, signal E which becomes "H" at bus accessing, signal READ which becomes "H" at reading cycle, signal WRITE which becomes "H" at writing cycle, and signal $\overline{BHE}$ which becomes "L" when accessing odd address, wherein said control circuit generating means produces control signals dependent on those input signals.

9. A control circuit for use in a computer, the computer having a direct memory access function in which a transfer of a plurality of memory words from a plurality of source addresses in a data source, beginning with a first address, to a plurality of destination addresses in a data destination is performed by transferring a plurality of transfer units, said computer having a mode register which outputs a word-size signal indicating whether the bit width of the words in said plurality of memory words is equal to the bit width of one transfer unit or is equal to twice the bit width of one transfer unit, wherein said mode register also outputs a direction signal, indicating whether the ascending/descending order in which said plurality of memory words are transferred from said data source is the same as the ascending/descending order in which said plurality of memory words are transferred to said data destination, the control circuit comprising:

reversing means for receiving a first signal indicating whether said first address is even or odd, and for receiving said word-size signal and said direction signal and for outputting a second signal, said second signal being the inverse of said first signal if said word-size signal indicates that the bit width of the words being transferred is twice the bit width of one transfer unit and the direction signal indicates that the ascending/descending order in which said plurality of memory words are transferred from said data source is not the same as the ascending/descending order in which said plurality of memory words are transferred to said data destination, said second signal being identical to said first signal in all other cases;

means for receiving said second signal and, in response, transferring data from said source to said destination, wherein said plurality of memory words are stored in said plurality of destination addresses of said destination without exchanging upper and lower order bits of any of said plurality of memory words.

10. A data transfer method for use in a computer, the computer having a direct memory access function in which a transfer of a plurality of memory words from a plurality of source addresses in a data source, beginning with a first address, to a plurality of destination addresses in a data destination is performed by transferring a plurality of transfer units, said computer having a mode register which outputs a word-size signal indicating whether the bit width of the words in said plurality of memory words is equal to the bit width of one transfer unit or is equal to twice the bit width of one transfer unit, wherein said mode register also outputs a direction signal, indicating whether the ascending/descending order in which said plurality of memory words are transferred from said data source is the same as the ascending/descending order in which said plurality of memory words are transferred to said data destination, the method comprising:

controlling a logic circuit and a memory transfer control circuit;

receiving, in said logic circuit, a first signal indicating whether said first address is even or odd, said word-size signal and said direction signal and outputting, from said logic circuit, a second signal, said second signal being the inverse of said first signal if said word-size signal indicates that the bit width of the plurality of memory words being transferred is twice the bit width of one transfer unit and the direction signal indicates that the ascending/descending order in which said plurality of memory words are transferred from said data source is not the same as the ascending/descending order in which said plurality of memory words are transferred to said data destination, said second signal being identical to said first signal in all other cases;

receiving said second signal in said memory transfer control circuit and, in response, transferring data from said source to said destination, wherein said plurality of memory words are stored in said plurality of destination addresses of said destination without exchanging upper and lower order bits of any of said plurality of memory words.

11. A DMA control device comprising:

at least a first and a second temporary storing means for data to be transferred from a transfer source beginning at a first address to a transfer destination through data buses;

switching means for shifting data between said at least first and second temporary storing means and each of the data buses;

control signal generating means for generating control signals for controlling the switching means;

determining means outputting a determined result indicating whether said first address is even or odd, wherein the control signal generating means produces said control signals in accordance with said determined result, so that data stored in the at least first and second temporary storing means are handled in the proper order regardless of whether the first address to be transferred is even or odd and whether the address increments or decrements; and reversing means for reversing said determined result output from said determining means when a first signal indicates a multiple byte configuration of transfer data and when a second signal indicates that data storage should proceed by decrementing, the first signal indicating whether the bit configuration of the transfer data is of one byte or more than one byte, and the second signal indicating whether data are stored in storage areas arranged in an increasing sequence or whether the data is to be stored in a decreasing sequence;

wherein said determining means comprises a flip flop having a first input coupled to an output of said reversing means.

12. The DMA control device according to claim 1, wherein said first and second signals are supplied from a mode register as a flag.

13. The DMA control device according to claim 1, wherein said first and second signals are supplied as input from outside of said DMA control device.

14. A DMA control device for sequentially storing a plurality of unit data constituting data to be transferred in a plurality of temporary storage means and then transferring the unit data from a transfer source to a transfer destination through data buses, the control device comprising:

a switch disposed between the plurality of temporary storage means and the data buses;

reversing means having an input terminal (Z terminal) for receiving the lowest order bit value (Z(ADO)) of a first address in the transfer source where the transfer data was stored or the lowest order bit value (Z(ADO)) of a first address in the transfer destination where the transfer data is to be stored, an output terminal (CNT terminal), an input terminal (X terminal) for receiving a first signal (X) indicating that the proceeding direction of addresses for storing the transfer data at a transfer source is different from that at a transfer destination, and an input terminal (Y terminal) for receiving a second signal (Y) indicating that data to be processed by a single transfer process is formed of the plurality of unit data, the reversing means for reversing the input lowest order bit value (Z(ADO)) when the first signal and the second signal are input and for outputting the reversed value from the output terminal (CNT terminal);

determining means, coupled to the output terminal of the reversing means, for receiving an output signal (CNT) sent from this output terminal and for outputting a determined result indicating whether the first address at a transfer source where the transfer data was stored or the first address at a transfer destination where the transfer data is to be stored is even or odd; and control signal generating means for generating a control signal for controlling the switch based on the output of the determining means in order to transfer the plurality of unit data to be processed by a single transfer process in the proper order.

* * * * *